(No Model.)
J. LETCHWORTH.
HAME.
No. 349,891.        Patented Sept. 28, 1886.
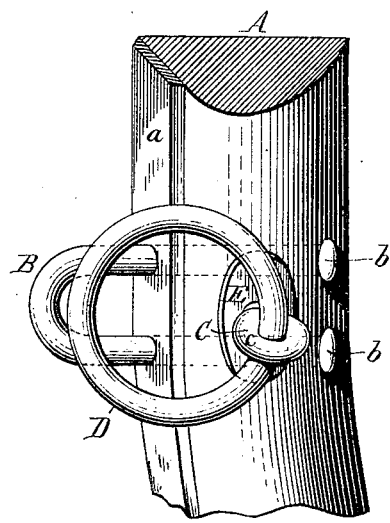
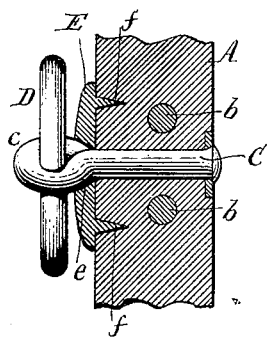
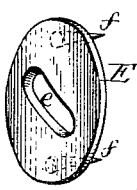

UNITED STATES PATENT OFFICE.

JOSIAH LETCHWORTH, OF BUFFALO, NEW YORK.

HAME.

SPECIFICATION forming part of Letters Patent No. 349,891, dated September 28, 1886.

Application filed June 10, 1886. Serial No. 204,799. (No model.)

*To all whom it may concern:*

Be it known that I, JOSIAH LETCHWORTH, of the city of Buffalo, in the county of Erie and State of New York, have invented a new and useful Improvement in Hames, of which the following is a specification.

This invention relates to that class of hames which are composed of a wooden body and metallic trimmings, and has for its object to securely hold the bolt to which the breast-strap ring is attached, and prevent said bolt from wearing the hame.

My invention consists of the improvements which will be hereinafter fully set forth, and pointed out in the claim.

In the accompanying drawings, Figure 1 is a perspective view of a portion of a hame provided with my improvements. Fig. 2 is a vertical section of the hame. Fig. 3 is a perspective view of the washer applied to the breast-strap bolt.

Like letters of reference refer to like parts in the several figures.

A represents the wooden body of the hame, provided on its outer side with a metallic back-strap, $a$, in the usual manner.

B represents the draft-staple, extending with its legs $b\ b$ transversely through the hame-body and back-strap.

C represents the eyebolt to which the breast-strap ring D is attached. The bolt C extends horizontally through the hame-body from front to rear between the legs $b$ of the staple, and at right angles thereto, in the usual manner.

E represents a washer applied to the front side of the hame-body, and provided with an opening, $e$, in which the eye $c$ of the bolt C is seated, and through which the bolt C passes. The washer E is provided on its rear side with spurs or projections $f$, which embed themselves in the hame-body when the bolt C is tightened, and secure the washer against turning. The opening $e$ in the washer is elongated, and the inner flat or elongated portion of the eye $c$ is fitted snugly in this elongated opening, whereby the bolt C is prevented from turning, and the washer is held rigidly against the hame. The washer E prevents the bolt C from becoming loose in the body of the hame, which occurs frequently in ordinary hames, and results in wearing out or enlarging the opening in which the bolt C is seated, whereby the hame is weakened and rendered unsightly.

I claim as my invention—

The combination, with the hame-body, of a bolt, C, provided with a breast-strap ring, and a washer, E, surrounding said bolt, and provided with projections $f$, which enter the hame-body, and whereby the washer is prevented from turning, substantially as set forth.

Witness my hand this 8th day of June, 1886.

JOSIAH LETCHWORTH.

Witnesses:
S. C. ADAMS,
J. W. DANFORTH.